United States Patent [19]

Graham

[11] Patent Number: 5,383,381
[45] Date of Patent: Jan. 24, 1995

[54] DOUBLE CUT DIE SET

[75] Inventor: John Graham, Sterling Heights, Mich.

[73] Assignee: Alpha Industries, Inc., Novi, Mich.

[21] Appl. No.: 173,965

[22] Filed: Dec. 22, 1993

Related U.S. Application Data

[63] Continuation of Ser. No. 1,768, Jan. 8, 1993, abandoned.

[51] Int. Cl.$^6$ .............................................. B26D 1/60
[52] U.S. Cl. ....................................... 83/385; 83/320; 83/618; 83/699.41
[58] Field of Search ................ 83/318, 319, 320, 698, 83/700, 377, 380, 384, 699.41, 385, 618

[56] References Cited

U.S. PATENT DOCUMENTS

| 3,129,624 | 4/1964 | Auer | 83/320 |
|---|---|---|---|
| 3,288,011 | 6/1965 | Borzym . | |
| 3,938,415 | 2/1976 | Borzym . | |
| 4,055,100 | 10/1977 | Borzym . | |
| 4,108,029 | 8/1978 | Borzym . | |
| 4,109,555 | 8/1978 | Borzym . | |
| 4,294,147 | 10/1981 | Borzym . | |
| 4,337,680 | 7/1982 | Borzym . | |
| 4,437,374 | 3/1984 | Borzym . | |
| 4,499,803 | 2/1985 | Borzym et al. . | |
| 4,563,927 | 1/1986 | Kinsley | 83/319 |
| 4,766,792 | 8/1988 | Borzym et al. . | |
| 4,796,498 | 1/1989 | Borzym . | |
| 4,848,723 | 7/1989 | Borzym | 83/320 |
| 4,932,297 | 6/1990 | Borzym et al. . | |
| 4,964,327 | 10/1990 | Nolan et al. . | |
| 4,964,328 | 10/1990 | Nolan et al. | 83/700 |
| 4,993,297 | 2/1991 | Nolan et al. . | |
| 5,003,853 | 4/1991 | Borzym et al. . | |
| 5,016,507 | 5/1991 | Riera et al. . | |

Primary Examiner—Richard K. Seidel
Assistant Examiner—Kenneth E. Peterson
Attorney, Agent, or Firm—Dinnin & Dunn

[57] ABSTRACT

A cut-off die set of the double cut type in which sections of tubing are successively severed from a length of tubing utilizing a notching cut followed by a severing cut. A notching blade is mounted to a notching blade holder slidably disposed on an adjustable mounting block. The notching blade holder includes a cam follower mounted thereon. The die set further includes a clamping apparatus having reciprocal clamping jaws operative to move between a clamped position and a released position whereby operation of the clamping jaws and the notching blade are controlled through a single cam mounted to an upper platen of the die set.

20 Claims, 3 Drawing Sheets

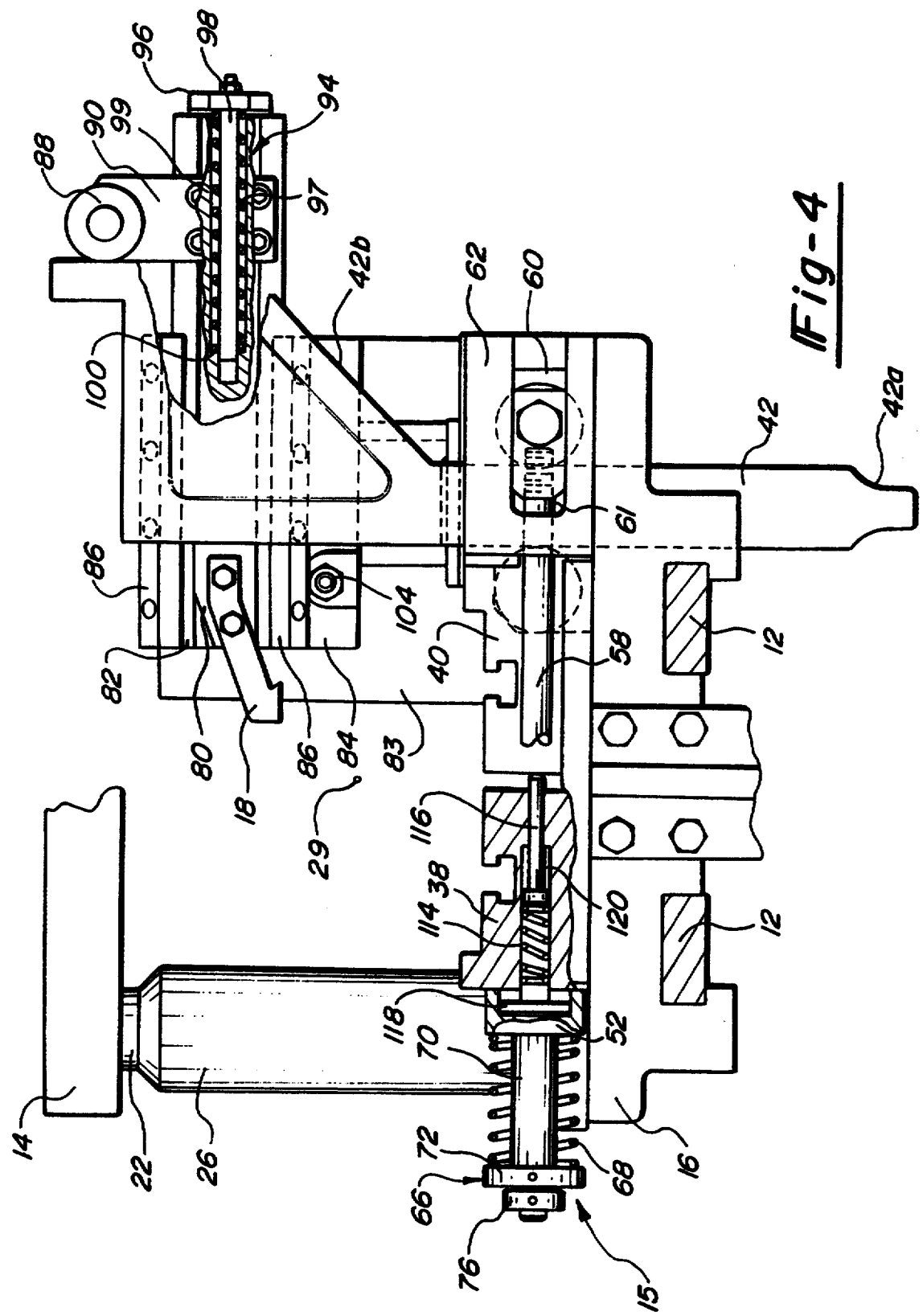

DOUBLE CUT DIE SET

This is a continuation of U.S. patent application Ser. No. 08/001,768, filed Jan. 8, 1993, now abandoned.

BACKGROUND OF THE INVENTION

1. Field of the Invention

The present invention relates to a tube cutting apparatus of the type used to sever lengths of tubing or other elongated stock continuously emanating from a fabrication mill.

2. Description of the Related Art

A typical tube cutting apparatus includes a cut-off die set operated by a ram. The die set is clamped to the tubing prior to the severing operation which is carried out by a vertically reciprocating cut-off or shearing blade. In cut-off systems of the double cut type after the die set is clamped to the tubing a notching blade is caused to move across and notch the upper periphery of the tubing prior to entry of the cut-off or shearing blade into the upper tube wall. Notching the tube in this manner reduces or eliminates dimpling or collapsing of the tube wall by the shearing blade, thus eliminating the need for reshaping the ends of the tubing after the cutting operation. Prior to notching the tubing, the tubing is typically clamped by a pair of opposed complemental die jaws which are mounted on reciprocally slidable mounting members having cam followers attached thereto. The cam followers engage a wedge cam which laterally displaces the cam followers and corresponding mounting members thereby closing the die jaws and clamping the die set to the tubing.

Once the tubing is clamped the notching blade is moved in a reciprocal manner across the upper periphery of the tubing by a cross slide. Both push and "pull across" notching methods are known. See for example U.S. Pat. Nos. 4,109,555 and 4,294,147. In order to translate the vertical reciprocal motion of the upper and lower platens into a horizontal reciprocal motion of the cross slide, a cam having a curvilinear cam track is mounted to the upper platen and a cam follower is fixed to the cross slide. As the ram of the cut-off press begins its downward stroke, the cam attached to the upper platen is also urged downward causing the cam follower to follow the curvilinear cam track. Movement of the cam follower causes movement of the cross slide which correspondingly drives the notching blade through the notching stroke. Once the tubing is severed, the press operating in a reverse manner raises the upper platen of the die set which causes the cam follower positioned in the curvilinear cam track to return the cross slide to its initial position in preparation for a new cutting cycle. Use of the cam/cam follower assembly in the manner set forth above allows the reciprocating vertical motion of the upper platen to be translated to a reciprocal horizontal motion of the cross slide. Cross slide assemblies of this type are known see U.S. Pat. No. 4,766,792.

Time is of the essence in the tube cutting industry, tubing continuously emanates from the tube mill at a high rate of speed. Thus any problems, delays or shut-downs for repair or replacement of the cutting equipment correspondingly results in a shut-down of the tubing mill resulting in loss production and revenue for the tube maker. A cut-off die set cycles at a high rate of speed, typically performing up to 60 cuts per minute. Therefore it is an object to simplify and reduce the size and weight of the die set components to reduce the inertial and frictional forces occurring during die set operation. Reducing the inertial and frictional forces and simplifying the operation of the die set reduces the potential for die set or component failure and increases the life of the die set. Increased die set life increases the period of time the mill is operational thereby increasing production and revenue for the tubemaker.

SUMMARY OF THE INVENTION

Accordingly, the present invention is a unique double cut die set for use in severing sections of an elongated workpiece. In general, invention includes upper and lower platens interconnected for reciprocal motion. A shearing blade is mounted to the upper platen. A notching blade holder is slidably disposed for reciprocal movement transverse the tube path on a support member mounted on the lower platen. The notching blade holder supports a notching blade which performs a notching cut prior to the severing stroke. The die set further includes a clamping assembly for clamping the die set to the workpiece. The clamping assembly includes a pair of opposed complemental die jaws for engaging the workpiece secured to first and second mounting members. The mounting members are operative to move said jaws between an open, released position and a closed, clamped position. First and second cam followers are coupled to the mounting members and engage a cam member which displaces the cam followers thereby urging the jaws into a closed, clamped position.

In the preferred form, the cam used to operate the clamping assembly also includes an additional cam surface. A cam follower mounted to the notching blade holder engages the additional cam surface such that a single cam controls operation of both the notching blade holder and the clamping assembly. This arrangement eliminates the need for a second cam to control the notching blade which reduces the overall weight and the inertial forces occurring during operation of the die set. Additionally, the use of a notching blade holder slidably disposed on the support simplifies the die set and improves die set efficiency,

BRIEF DESCRIPTION OF THE DRAWINGS

FIG. 4 is an end elevational view of the double cut die set set forth in FIG. 1 with portions removed for clarity.

DESCRIPTION OF THE PREFERRED EMBODIMENT

Figure 1:
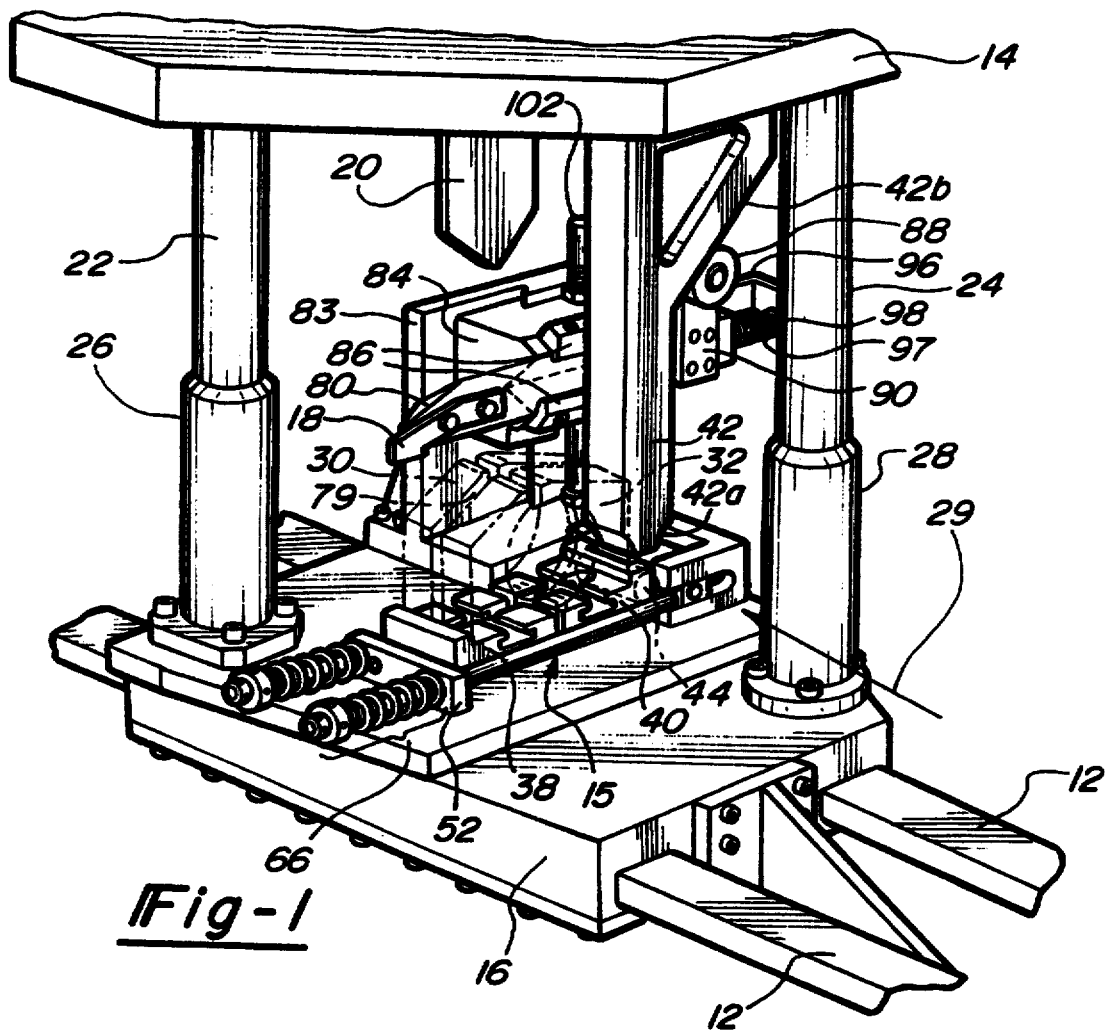
FIG. 1 is a perspective view of a double cut die set according to the present invention.

The illustrated die set 10 is adapted to be employed in a tube cutting apparatus and is slidably moveable on a set of rails 12 which are part of a press base. The press includes a swinging or reciprocating ram mechanism (not shown) which bears against an upper platen 14 and serves to operate the cut-off die set 10. In die sets of the general type with which the present invention is concerned, the die set is positioned to receive the tubing as it emanates from a fabrication mill and the ram mechanism operates to cause a clamping assembly, generally indicated at 15, mounted on the lower platen 16 of the die set 10 to clamp the die set to the rapidly moving tubing. The die set 10 clamped to the moving tube moves together with the tube along the rails 12. The ram mechanism then causes a notching blade 18 to make a notching cut in the upper periphery of the tubing, whereafter a main cutoff or shearing blade 20 is lowered to sever a length from the moving tube. Following the severing cut, the ram mechanism then operating in a reverse manner first causes the retraction of the shearing blade 20, then the notching blade 18 and then unclamping of the die set 10 from the tube section as the die set 10 approaches the end of its travel on the rails 12. The die set 10 is then returned to its initial position on the rails 12 preparatory to initiation of a new cut-off cycle. The foregoing description of a flying, double-cut operation not withstanding, the invention is also useful for stationary cut applications.

The upper and lower platens 14, 16 are interconnected by a plurality of guide rods 22 and 24 extending downward from spaced locations on the underside of upper platen 14 and positioned within bushings 26, 28 secured to and extending upward from the lower platen 16. The bushings 26, 28 telescopingly receive the guide rods 22, 24 so as to guide the upper platen 14 in reciprocal movement relative to the lower platen 16 during the tube severing operation.

Tubing (not shown) emanating from the tube forming mill is clamped to the die set 10 by two pairs of die jaws 30 and 32. The reciprocal clamping and release movement of the die jaws 30, 32 is produced by sliding movement of first and second die jaw holders 38 and 40 which are slidable on the lower platen 16. The first and second die jaw holders 38, 40 are adapted to be reciprocated toward and away from each other in synchronous movement with the upper platen 14 relative to the lower platen 16 by coaction of the wedge cam surface 42a of a cam 42 extending between a pair of clamping rollers 44 and 56 coupled respectively to the first and second die jaw holders 38, 40.

Figure 2:
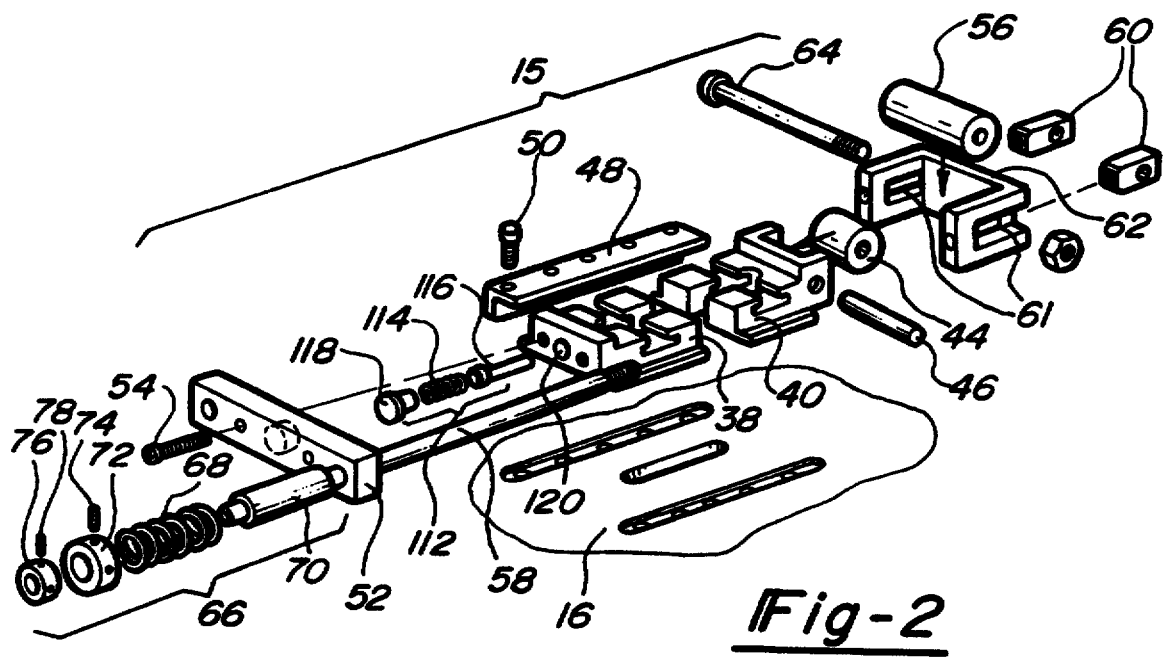
FIG. 2 is an exploded perspective view of a clamping assembly for use in the double cut die set of FIG. 1.

Referring now to FIG. 2, the clamping assembly 15 is shown. The clamping assembly 15 includes first and second die jaw holders 38 and 40. The die jaw holders 38 and 40 are secured to the lower platen 16 by a gib 48 fastened to the lower platen by threaded fasteners 50. Inner die jaw holder 40 includes a cam follower, illustrated as a roller 44, mounted on a shaft 46. Outer die jaw holder 38 is fastened to a back plate 52 by threaded fasteners 54. The back plate 52 is connected to an outer die jaw cam follower, illustrated as a roller 56, through connecting rods 58. The ends of the connecting rods 58 opposite the back plate 52 threadably engage lug nuts 60 slidably disposed in respective channels 61 on a bracket 62. The lug nuts 60 have transverse cylindrical bores 63 therein which receive an axle 64 upon which the roller 56 is mounted. A return means for returning the die jaws 30, 32 to the open, released position is shown generally at 112. The return means 112 included a compression spring 114 and plunger 116 assembly mounted in an aperture 120 on the outer die jaw holder 38. As shown in FIG. 4, a retainer member 118 is used to retain the spring 114 and plunger 116 assembly within the outer die jaw holder 38. The plunger 116 engages the inner die jaw holder 40, whereby the spring 114 biases the inner and outer die jaw holders into the open, released position when the wedge cam surface 42a of the cam 42 is positioned between the rollers 44, 56.

Mounted adjacent the back plate 52 is an overload mechanism seen generally at 66. The overload mechanism includes a spring 68 mounted over a collar 70. The spring 68 is held in place by an annular locking ring 72 secured by a locking screw 74. The collar 70 is secured to the connecting rod 58 by a second annular locking ring 76 secured by a locking screw 78. It should be appreciated that the overload mechanism 66 allows the outer die jaw 30; i.e., the die jaw 30 on the side of lower platen 16 opposite the side on which the rollers 44, 56 and the die jaw cam 42 are positioned to be displaced which prevents failure of the axles 46, 64 or other die set 10 components should a foreign article become jammed between the die jaws 30, 32 during the cutting operation.

A shearing blade 20 is mounted to the upper platen 14 of the die set 10 and extends downwardly from upper platen 14. The die jaws 30, 32 are spaced apart relative to the tube path to create a clearance space 79 through which the shearing blade 20 passes when the ram mechanism reciprocates the upper platen 14 downward a sufficient distance to pass the shearing blade 20 through the tube.

A notching assembly operates to provide a notching cut in the upper periphery of the tube prior to the downward severing movement of the shearing blade 20. The notching cut precludes the necessity of further working of the severed tube section following the shearing operation. The notching assembly includes a notching blade 18 supported on a notching blade holder 80 slidably held in a v-shaped channel 82 on a mounting block 84. The notching blade holder 80 is retained in the channel 82 by a pair of gibs 86. It should be appreciated that the notching blade holder 80 is mounted for slidable reciprocal motion in a direction transverse the tube path 29. A cam follower 88 is secured to the notching blade holder 80 by means of a bracket 90. The cam follower 88 engages a cam surface 42a of the upper portion of the cam 42. Downward travel of the upper platen 14 causes the cam follower 88 to follow cam surface 42a which causes the notching blade 18 to be pulled across the upper periphery of the tubing. Both the clamping assembly 15 and notching blade 18 are actuated and controlled by the same cam 42, thus eliminating the necessity for two cams as was used in prior designs.

The notching blade 18 is returned after the notching stroke by means of a spring return assembly seen generally at 94. The spring return assembly 94 includes a bracket 96 mounted adjacent one end of the notching blade holder 80. A spring 97 is mounted over a post member 98 secured to the bracket 96. The spring 87 and post 98 are disposed with a bore 99 in the notching blade holder 80 such that the spring 97 engages a shelf 100 within the bore 99. The spring 87 is compressed against the shelf 100 and biases the cam follower 88 against the cam surface 42a of the cam 42. As the upper platen 14 is returned to its initial position, the spring 97 returns the notching blade 18 to its initial position in preparation for the next cut.

Figure 3:
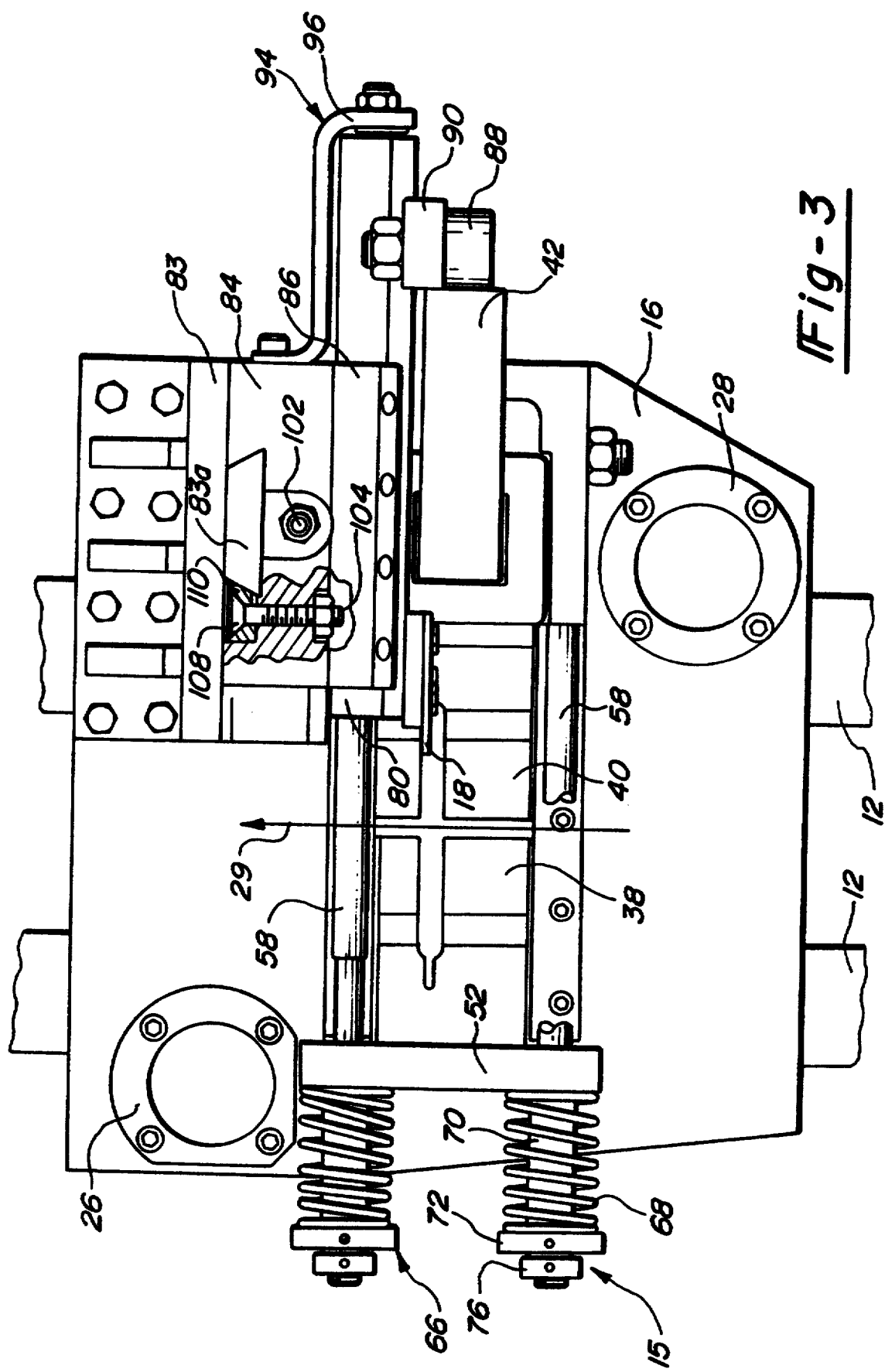
FIG. 3 is a top view of the double cut die set set forth in FIG. 1 with portions removed for clarity.

The mounting block 84 may be adjusted to any position along the support member 83 by means of an adjustment screw 102 having a shaft rotatably engaging the lower portion of the support 83. As shown in FIG. 3, the mounting block 84 includes a dove-tail shaped channel 84a which is complementary to a dove-tail flange 83a on the mounting block 84. By rotating the adjustment screw 102, the mounting block 84 may be positioned on the support 83 and the depth of the notch may be set. Once set at the proper position, the mounting block 84 may be locked into position using locking screw 104. Tightening the nut 106 exerts pressure on the head portion 108 of the locking screw 104 and attached wedge member 110 whereby the wedge member 110 engages the dove-tail flange 83a of the support 83 to lock the mounting block 84 to the support 83.

It should be appreciated that the described die set allows a quick change of the notching blade 18 by simply removing the bracket 96 allowing the blade holder 80 to be slidably removed from the channel 82. The notching blade 18 may also be attached to the blade holder 80 by any one of several other known quick change methods. See U.S. Pat Nos. 4,964,328, 4,993,297 and 4,993,298.

The described arrangement for mounting a notching blade 18 will be seen to provide a firm positive support for the blade throughout the reciprocal motion necessary to accomplish the notching cut. Specifically the described support mechanism reduces the weight and correspondingly the inertia of the moving portions of the notching blade assembly and allows for various adjustments of the notching blade 18 with respect to the required notching depth. The mounting arrangement allows for the notching blade 18 to be releaseably secured to the notching blade holder 80 and includes a safety feature to prevent catastrophic failure should a moveable object be left within the die set; i.e., should a shearing blade 20 be broken and left within the die jaws 30, 32 when the upper platen 14 is returned to its fully vertical position, the notching blade 18 upon encountering the broken shearing blade 20 will remain on one side of the tube path 29 as the spring 96 will remain compressed.

Further, the described die set 10 allows the use of a single cam to initiate and control operation of both the notching assembly and the clamping assembly.

Although a preferred embodiment of the invention has been illustrated and described in detail, it will be apparent that various changes may be made in the disclosed embodiment without departing from the scope or spirit of the invention.

Moreover, the terms vertical and horizontal are used herein in a relative sense and do not suggest any given orientation of the mechanism described or placed into actual use.

What is claimed is:

1. A cut-off die set used to sever sections of an elongated workpiece comprising:
    upper and lower platens interconnected for reciprocal motion;
    a shearing blade mounted to the upper platen;
    a support mounted to said lower platen;
    a notching blade;
    a notching blade holder releaseably connected to said support, such that said notching blade holder may be adjustably positioned on said support;
    means for adjusting the position of said notching blade holder on said support wherein said means remains stationary during said notching stroke and said support remains stationary;
    a pair of opposed jaws for engaging the workpiece;
    first and second mounting members, said jaws mounted to said first and second mounting members wherein said first and second mounting members are operative to move said jaws between an open, released position and a closed, clamped position;
    first and second cam followers connected to said first and second mounting members;
    a third cam follower mounted to said notching blade holder; and
    a cam having first, second and third cam surfaces thereon, said first, second and third cam followers engaging said first, second and third cam surfaces respectively, such that movement of said cam displaces said cam followers in a timed relationship.

2. A cut-off die set as set forth in claim 1 wherein said first and second cam surfaces define a wedge shape for engaging said first and second cam followers and operative to urge said first and second cam followers apart.

3. A cut-off die set as set forth in claim 1 wherein said third cam surface includes a curvilinear surface operative to engage said third cam follower.

4. A cut-off die set as set forth in claim 1 including overload means for preventing a force overload of the jaws.

5. A cut-off die set as set forth in claim 4 wherein said overload means includes a compliant member.

6. A cut-off die set as set forth in claim 1 including overload means for preventing a force overload of the jaws; wherein said cam depends from said upper platen and is disposed on one side of said workpiece; said opposed jaws are mounted to said first and second mounting members to form inner and outer jaws, said inner jaw positioned on the same side of the workpiece as said cam; said outer jaw positioned on the opposite side of the workpiece; and said third cam surface engaging said third cam follower such that the notching blade exerts a force on said inner jaw during a notching stroke.

7. A cut-off die set according to claim 1 including return means for returning said notching blade to an initial position when said upper platen is returned to an initial position.

8. A cut-off die set according to claim 7 wherein said return means includes a spring.

9. A cut-off die set according to claim 1 wherein said means for adjusting the position of said notching blade holder includes an adjustment screw.

10. A cut-off die set according to claim 1 including a mounting block engaging said support; and
    an elongated member slidably connected to said mounting block wherein said notching blade is secured to said elongated member.

11. A cut-off die set according to claim 9 wherein said support includes a dove-tail shape projection;
    said mounting block having a complementary dove-tail shaped channel therein such that said mounting block is slidably disposed on said support; and
    a lock associated with said mounting block and operative to secure said mounting block to said support.

12. A cut-off die set as set forth in claim 1 including means for urging said jaws into said open, released position.

13. A cut-off die set used to sever sections of an elongated stock comprising:
    upper and lower platens interconnected for reciprocal motion;
    a shearing blade mounted to said upper platen;
    a support mounted to said lower platen;
    a mounting block engaging to said support;
    a notching blade secured to a notching blade holder, said notching blade holder mounted on said mounting block for reciprocal motion;
    a cam follower secured to said notching blade holder;

a bracket secured to said mounting block, a spring positioned between said notching blade holder and said bracket; and a cam secured to said upper platen, said cam having a cam surface wherein said cam follower engages said cam surface.

14. A cut-off die set as set forth in claim 13 including an adjustment means engaging said mounting block for adjusting the position of said mounting block on said support.

15. A cut-off die set according to claim 14 wherein said adjustment means includes an adjustment screw.

16. A cut-off die set as set forth in claim 13 wherein said support includes a dove-tail shaped projection and said mounting block having a complementary dove-tail shape channel such that said mounting block is slidably disposed on said support.

17. A cut-off die set as set forth in claim 16 including a lock engaging and locking said mounting block to said support.

18. A cut-off die set used to sever sections of an elongated stock comprising:

upper and lower inner platens interconnected for reciprocal motion in a first direction;

a shearing blade mounted to the upper platen;

a clamping apparatus mounted to the lower platen;

a notching blade coupled to a notching blade holder, said notching blade holder mounted for reciprocal motion in a second direction on a holder support member;

an upright stationary member mounted to the lower platen, said holder support member adjustably mounted on said upright stationary member for movement in a direction having a component thereof parallel said first direction;

a unitary actuating means engaging both said clamping apparatus and said notching blade holder, said actuating means operative by the reciprocal motion of said platens to actuate said clamping apparatus and said notching blade holder.

19. A cut-off die set as set forth in claim 18 wherein said actuating means includes a cam member having multiple cam portions including a first portion, said first portion including a wedge cam for engaging said clamping apparatus and a second portion, said second portion including a cam surface engaging said notching blade holder.

20. A cut-off die set according to claim 18 including a bracket mounted to said holder support member and a spring positioned between said bracket and said notching blade holder.

* * * * *